(12) United States Patent
Parhi et al.

(10) Patent No.: US 7,561,633 B2
(45) Date of Patent: Jul. 14, 2009

(54) SYSTEM AND METHOD FOR MIMO EQUALIZATION FOR DSP TRANSCEIVERS

(75) Inventors: Keshab K. Parhi, Maple Grove, MN (US); Yongru Gu, Lake Forest, CA (US)

(73) Assignee: Leanics Corporation, Maple Grove, MN (US)

( * ) Notice: Subject to any disclaimer, the term of this patent is extended or adjusted under 35 U.S.C. 154(b) by 557 days.

(21) Appl. No.: 11/487,067

(22) Filed: Jul. 13, 2006

(65) Prior Publication Data

US 2007/0014378 A1  Jan. 18, 2007

Related U.S. Application Data

(60) Provisional application No. 60/699,169, filed on Jul. 13, 2005.

(51) Int. Cl.
*H04L 7/02* (2006.01)
*H04L 1/02* (2006.01)

(52) U.S. Cl. .............. 375/267; 375/229; 375/232; 375/233; 375/346; 375/347; 375/348; 375/349; 375/350

(58) Field of Classification Search ......... 375/229–236, 375/267, 346–350
See application file for complete search history.

(56) References Cited

U.S. PATENT DOCUMENTS

| 7,212,566 B2* | 5/2007 | Zhang et al. ............. 375/229 |
| 2005/0009486 A1* | 1/2005 | Al-Dhahir et al. ......... 455/213 |

* cited by examiner

*Primary Examiner*—Curtis B Odom

(57) ABSTRACT

A method to efficiently deal with FEXT crosstalk in wireline communication system via MIMO equalization is presented. A MIMO-DFE based receiver architecture is developed to demonstrate the advantage over the traditional receiver design. A MIMO structure for systems with TH precoding is also developed for 10GBASE-T application. The proposed architecture overcomes the limitation of the traditional schemes and achieves a better SNR performance and lower receiver complexity. The proposed method relies on the fact that FEXT inherently contains information about the symbols transmitted from the three far end transmitters and it can be viewed as a signal rather than noise. Therefore, MIMO techniques are applied to turn FEXT into a benefit for the receiver design.

24 Claims, 18 Drawing Sheets

(a) Typical application of TH precoding (b) TH precoding: Equivalent form (a) MIMO-THP Structure (b) MIMO-THP: Equivalent form

SYSTEM AND METHOD FOR MIMO EQUALIZATION FOR DSP TRANSCEIVERS

CROSS-REFERENCE TO RELATED APPLICATIONS

This application claims the benefit of U.S. Provisional Application No. 60/699,169, filed on Jul. 13, 2005, the entire content of which is incorporated herein by reference in its entirety.

STATEMENT REGARDING FEDERALLY-SPONSORED RESEARCH AND DEVELOPMENT

This invention was made with Government support under the SBIR Grant No. DMI-0441632, awarded by the National Science Foundation (NSF). The Government has certain rights in this invention.

FIELD OF THE INVENTION

The present invention relates to data processing, transmission, and digital communication. More specifically, it is related to multi-input multi-output (MIMO) equalization for digital signal processing (DSP) transceivers.

BACKGROUND OF THE INVENTION

Equalization technique is widely used in many wireline communication systems, such as digital subscribe line (DSL) systems and gigabit ethernet systems, to combat the intersymbol interference (ISI). In 10 Gigabit Ethernet over copper (10GBASE-T) system, full duplex baseband transmission is performed over four pairs of unshield twisted pair (UTP) and the received signal suffers from lots of interferences. ISI is a significant impairment against reliable high speed digital transmission over the UTP cable. To meet the desired throughput (10 Gbps) and target BER ($10^{-12}$) requirements, efficient equalization is needed in the DSP transceiver design.

Traditionally, equalization is performed individually for each channel in 10GBASE-T system, where four separate feed-forward equalizers (FFE) are used at the receiver side to mitigate the pre-cursor ISI for each channel and corresponding 4 separate decision feedback equalizers (DFE) are used to deal with the post-cursor ISI. Far-end crosstalk (FEXT) is treated as noise to be cancelled after the FFE. To reduce the FEXT interference to a satisfactory level, three FEXT cancellers are needed for each pair of cables. Since there are four pairs of cables (four channels) in 10GBASE-T, a total of 12 FEXT cancellers are needed at the receiver side and each of them will have about 200 taps (See, e.g., IEEE 802.3an 10GBASE-T Tutorial, http://grouper.ieee.org/groups/802/3/tutorial/index.html, November 2003). Implementing these FEXT cancellers requires a significant amount of silicon area and power consumption. Because the input signals for FEXT cancellers are derived from the tentative decisions of the received signals and are mostly incorrect estimates of the transmitted symbols from far end, wrong signals are produced at the FEXT canceller output. This finally leads to significant performance loss in terms of SNR. We also note that the levels of FEXT varies significantly depending on cabling and connectors, especially at intermediate lengths, between 20 and 50 meters, where FEXT is a dominant issue. It is important to satisfy the performance of these transceivers at all lengths. In other words, a flexible solution needs to be found to work under different cabling environments (See, e.g., IEEE 802.3an 10GBASE-T Study Group, http://www.ieee802.org/3/an/public/material/index.html). All these make DSP transceiver design for 10GBASE-T more challenging. Thus, it is of great intest to develop new equalization schemes for the 10GBASE-T application.

What is needed is a new design methodology or technique for efficiently dealing with FEXT crosstalk that overcomes the limitation of the traditional schemes and achieve a better SNR performance and lower receiver complexity.

BRIEF SUMMARY OF THE INVENTION

The present invention describes a new method for equalization and FEXT treatment in 10GBASE-T to acquire better performance with low complexity and provides two solutions for DSP transceiver design in the cases where classical decision feedback equalization (DFE) structure is adopted at the receiver side and pre-equalization is performed at the transmitted side.

In accordance with the present invention, we treat FEXT crosstalk as signal rather than noise in traditional scheme and perform MIMO equalization to make use of the FEXT signals. In the proposed MIMO architecture, we do not need 12 FEXT cancellers at all. Instead, a MIMO-DFE structure containing a 4×4 MIMO feed-forward equalizer and a 4×4 MIMO feedback equalizer is developed. This architecture has less complexity than the traditional scheme and higher SNR gain at the decision point. Considering the received signal also suffers from echo and NEXT interferences, two different arrangements of echo and NEXT cancellers MIMO structure are also presented. Due to the error propagation of the classical MIMO-DFE structure, Tomlinson-Harashima Precoding (THP) is proposed to be used in 10GBASE-T system. Therefore, a MIMO MMSE-TH structure is also developed by moving the feedback part of the MIMO-DFE to the transmitter, while keeping the 12 cross decision feedback filters at the receiver to deal with the residual post-cursor interferences. The resulting design has better performance than classical MIMO-DFE structure while slightly increasing the transmitter complexity.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. The accompanying figure, which are incorporated herein, form part of the specification, illustrate the present invention and, together with the description, further serve to explain the principles of the invention and to enable a person skilled in the relevant art to make and use the invention.

DETAILED DESCRIPTION OF THE INVENTION

Background on Traditional Equalization Scheme and FEXT Treatment in 10GBASE-T

Figure 1:
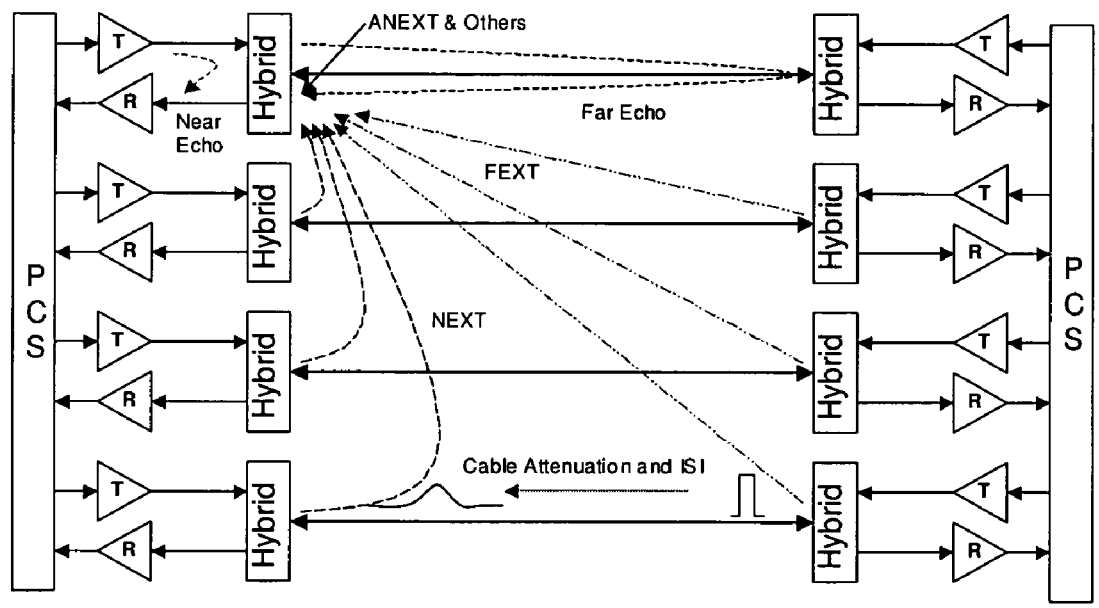
FIG. 1 illustrates typical channel setup of 4 pairs of UTP in 10GBASE-T.

Consider typical 10GBASE-T channel environment over UTP cables in FIG. 1, we see that, the received signal not only suffers from signal attenuation and ISI but also suffers from echo, near-end crosstalk, far-end crosstalk, and other interferences such as alien NEXT. To meet the desired throughput and target BER requirements, the receiver has to perform a significant amount of digital adaptive filtering operations. The traditional scheme presented for 10GBASE-T uses four separate feed-forward equalizers to individually remove precursor ISI for each channel and treat FEXT crosstalk as noise to be cancelled after the FFE. Consider the block diagram of the typical 10GBASE-T transceiver for one pair in FIG. 2, we need three FEXT cancellers for each of four channels (or four pairs). These cancellers can be implemented based on adaptive FIR filters with the input signals derived from tentative decisions. Since there are four pairs of cables in 10GBASE-T, a total of 12 FEXT cancellers are needed for FEXT cancellation.

Figure 2:
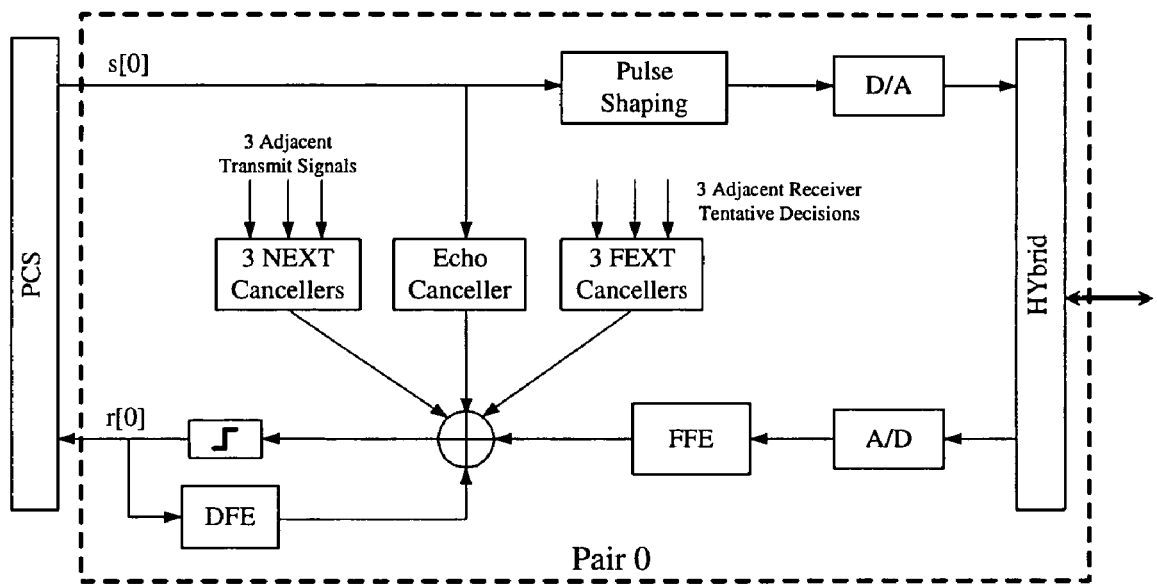
FIG. 2 illustrates block diagram of the traditional transceiver in 10GBASE-T for one pair.

The main problem associated with the design in FIG. 2 is FEXT cancellation. First, FEXT cancellation can not provide better performance as expected. Inherently, FEXT crosstalk contains information about the transmitted symbols from three adjacent remote (far end) transmitters. If FEXT crosstalk is cancelled as colored noise at the receiver, this information will be lost and further improvement in SNR performance will be impossible. Second, implementing FEXT cancellers in a straightforward way requires a significant hardware cost (power and area), which will be a critical issue in 10GBASE-T transceiver design. Therefore, it is important to find a new way to deal with FEXT rather than simply cancel it.

MIMO Equalization for 10GBASE-T

Consider signal transmission path in FIG. 1, we note that, each far end signal is transmitted by 4 sub-channels, three of which are FEXT channels. In other words, for each receiver, FEXT crosstalk inherently contains information about the symbols transmitted from the other 3 remote transmitters. Hence, it is better to exploit the far end crosstalk as a signal that contains useful information rather than simply treat it as noise.

Figure 3:
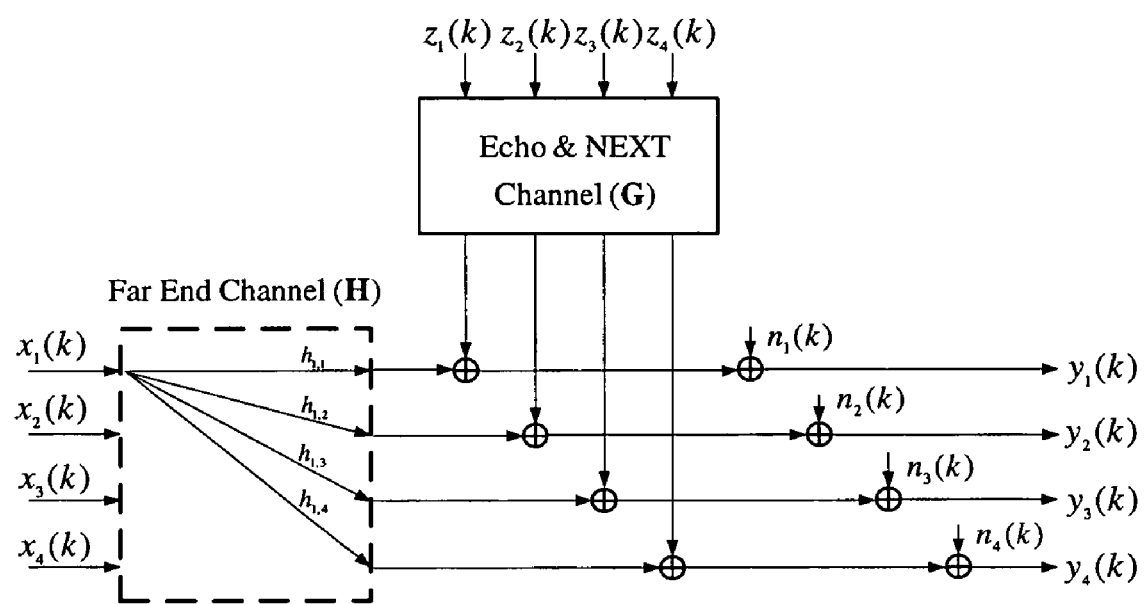
FIG. 3 illustrates MIMO channel model of the 4 pairs of UTP cable in 10GBASE-T.

Recently, new signal processing techniques based on multi-input multi-output (MIMO) approaches have emerged for providing higher channel capacity. In a MIMO system, information is sent synchronously on multiple transmitters and collected on multiple receivers. By exploiting information from spatial dimension, MIMO signal processing can increase the capacity. As shown in FIG. 3, 10GBASE-T transmission system over 4 pairs of UTP can be viewed as a MIMO system. Thus, it is possible to exploit FEXT signal based on MIMO equalization techniques.

In this invention, 10GBASE-T transmission system over UTP is first modeled as a MIMO communication system. Next, the MIMO finite length minimum mean square error decision feedback equalizer (MMSE-DFE) structure is applied to combat ISI. Information contained in the FEXT crosstalk then can be exploited to improve system performance by the resulting MIMO MMSE-DFE structure. Two different echo and NEXT cancellers based on this MIMO equalization architecture are also developed to explore better system performance. To eliminate error propagation in the MIMO-DFE structure, TH precoding technique is applied by moving the feedback part of the MIMO-DFE to the transmitter. For the real application of 10GBASE-T, 4 separate TH precoders operate at the transmitter side and 12 cross decision feedback filters in the MIMO-DFE structure are kept at the receiver to combat the residual post-cursor interferences.

System Model

To explore the MIMO technique in 10GBASE-T, 4 pairs of UTP cable can be modeled as two channels shown in FIG. 3. One is the MIMO channel from far end transmitters to near end receivers, which can be described as a matrix $(h_{i,j})_{i=1 \ldots 4, j=1 \ldots 4}$ of time discrete impulse responses and the other is the Echo and NEXT channel from near end transmitters to near end receivers, which can be described as a matrix $(g_{m,n})_{m=1 \ldots 4, n=1 \ldots 4}$ of time discrete impulse responses, where $h_{i,j}$ denotes the MIMO channel impulse response from the ith input to the jth output with length v +1. Similarly $g_{m,n}$ is the Echo and NEXT channel impulse response from mth input to the nth output with length l+1. Let $x_i$ denote the transmitted symbol sequence from the ith far end transmitter and $z_m$ denote the transmitted symbol sequence from the mth near end transmitter, and $n_j$ denote background noise at the jth channel output. Then the jth channel received symbol sequence is given by $$y_j = h_{j,j} \otimes x_j + \sum_{\substack{i=1 \\ i \neq j}}^{4} h_{i,j} \otimes x_i + g_{j,j} \otimes z_j + \sum_{\substack{m=1 \\ m \neq j}}^{4} g_{m,j} \otimes z_m + n_j. \quad \text{EQ. (1)}$$

for j=1, . . . , 4. where ⊗ denotes convolution.

By grouping symbols from 4 received channel at time k into a column vector $y(k) \triangleq [y_1(k) \ y_2(k) \ y_3(k) \ y_4(k)]^T$, EQ. (1) can be expressed as follows:

$$y(k) = \sum_{\tau=0}^{v} H_\tau x(k-\tau) + \sum_{p=0}^{l} G_p z(k-p) + n(k) \quad \text{EQ. (2)}$$

where $H_\tau$ and $G_p$ represent 4×4 τth far end channel coefficient matrix and pth near end channel coefficient matrix, respectively. The signals $x(k-\tau)$ and $z(k-\tau)$ correspond to far end transmitted column vector and near end transmitted column vector at time index $k-\tau$. By stacking $N_f$ successive channel output vector samples, $y(k)$, EQ. (2) can be expressed in matrix form as follows:

$$y(k+N_f-1:k) = H \cdot x(k+N_f-1:k-v) + n(k+N_f-1:k) + G \cdot z(k+N_f-1:k-l). \quad \text{EQ. (3)}$$

where $y(k+N_f-1:k) \triangleq [y^T(k+N_f-1) \ldots y^T(k)]^T$. $N_f \times (N_f+v)$ matrix H and $N_f \times (N_f+l)$ matrix G are both block Toeplitz matrices which are defined as $$H = \begin{bmatrix} H_0 & H_1 & \cdots & H_v & 0 & \cdots & 0 \\ 0 & H_0 & H_1 & \cdots & H_v & \cdots & 0 \\ \vdots & & \ddots & & & \ddots & \\ 0 & \cdots & 0 & H_0 & H_1 & \cdots & H_v \end{bmatrix}, \quad \text{EQ. (4)}$$

$$G = \begin{bmatrix} G_0 & G_1 & \cdots & G_l & 0 & \cdots & 0 \\ 0 & G_0 & G_1 & \cdots & G_l & \cdots & 0 \\ \vdots & & \ddots & & & \ddots & \\ 0 & \cdots & 0 & G_0 & G_1 & \cdots & G_l \end{bmatrix}. \quad \text{EQ. (5)}$$

MIMO-DFE Equalization and Cancellation

Figure 4:
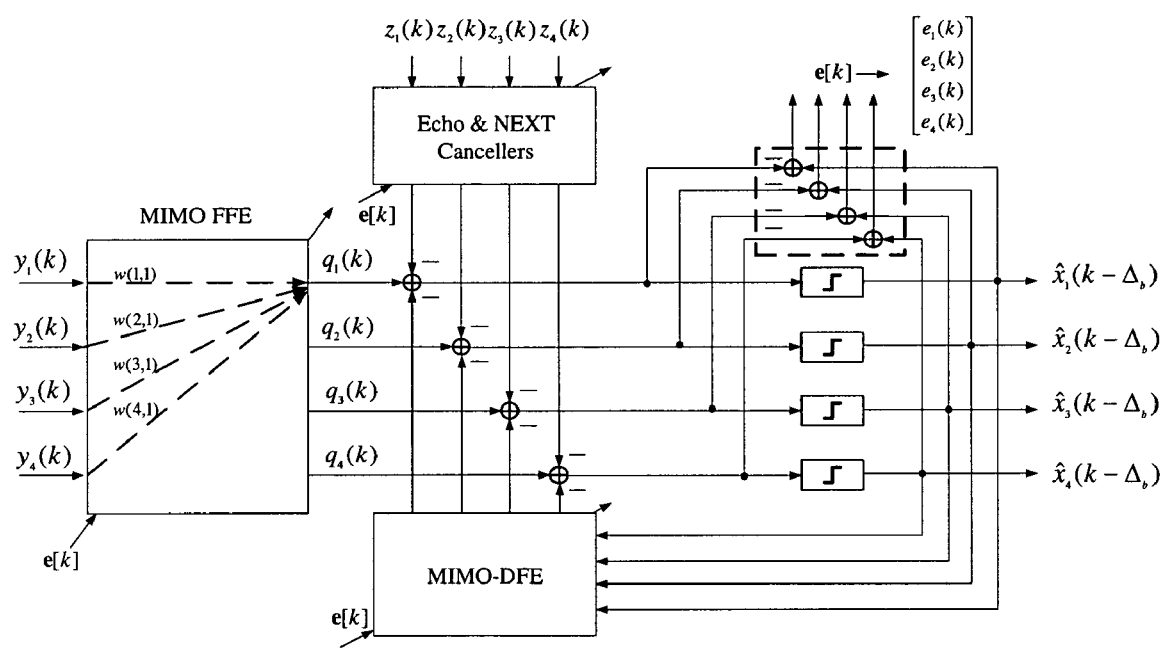
FIG. 4 illustrates block diagram of the joint MIMO-DFE equalization and cancellation adaptive structure.
Figure 5:
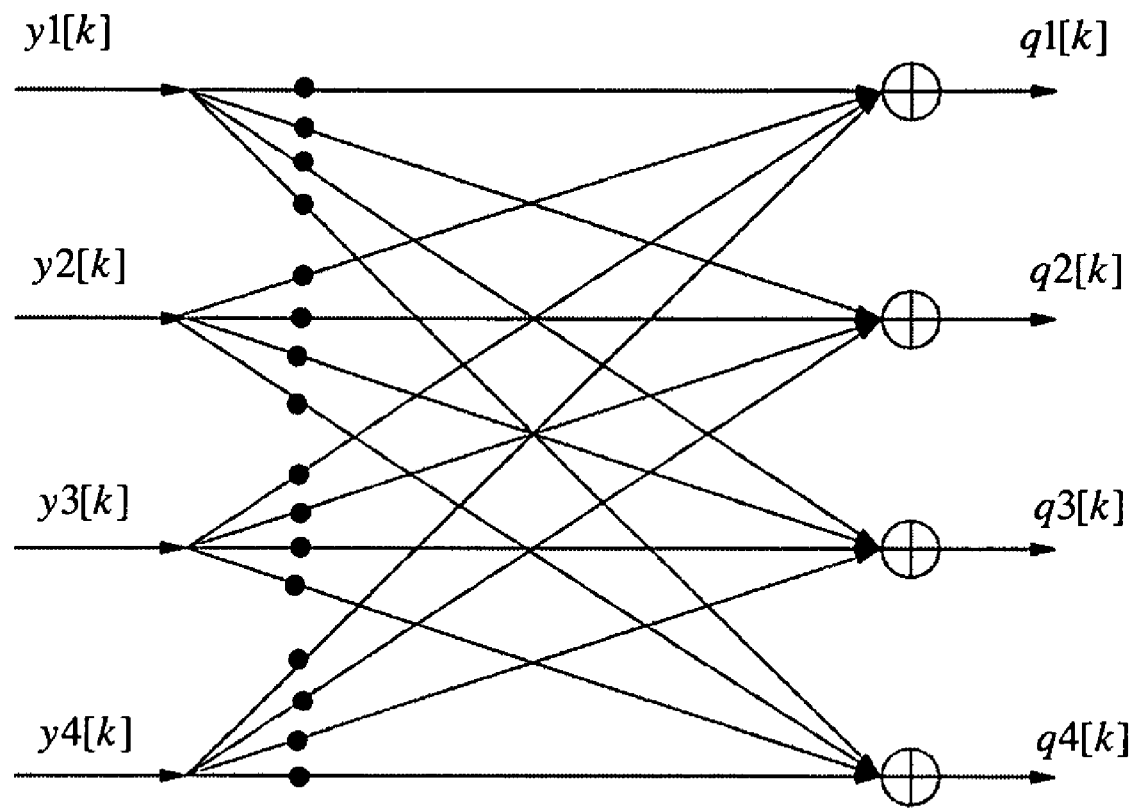
FIG. 5 illustrates the detailed block diagram of the MIMO-FFE equalizers.

FIG. 4 shows the block diagram of the proposed joint MIMO-DFE equalization and cancellation scheme. In this figure, $y_i(k)$ denotes the received signal collected by the i-th receiver of the near end. MIMO FFE is first used to remove pre-cursor ISI and exploit FEXT signals. The MIMO FFE can be implemented using 16 FIRs, as shown in FIG. 5. After FFE, Echo & NEXT interferences are easily cancelled since near end transmitted signal $z_i(k)$ is usually known to the receiver at the same end. Instead of using FEXT cancellers, a MIMO DFE is used with 16 short length FIRs, which use a similar structure as in FIG. 5. Since the whole receiver architecture operates in an adaptive manner, the echo & NEXT cancellers and MIMO-DFE are jointly adapted to minimize mean squared error, $E(e^2)$. Let $N_f, N_b, N_p+1$ be the lengths of the feed forward filter matrix W, feedback filter matrix B, and echo & NEXT cancellation filter matrix P, respectively. The optimal coefficients of these filters can be obtained by applying the classical least mean square (LMS) algorithm due to its simplicity and low computational cost.

Another indirect approach to compute the optimal coefficients of the filters in FIG. 4 requires channel impulse responses (CIR) or estimates of CIR and the auto-correlation sequence of the received signals; and it can achieve theoretically optimum performance when these estimates are error free. By applying the so-called generalized Schur algorithm (See, e.g., Naofal Ai-Dhahir and Ali H. Sayed, "The finite-length mulit-input multi-output MMSE-DFE," *IEEE Trans. Signal Processing*, vol. 48, pp. 2921-2936, October 2000), the optimal tap coefficients can be computed efficiently.

Figure 6:
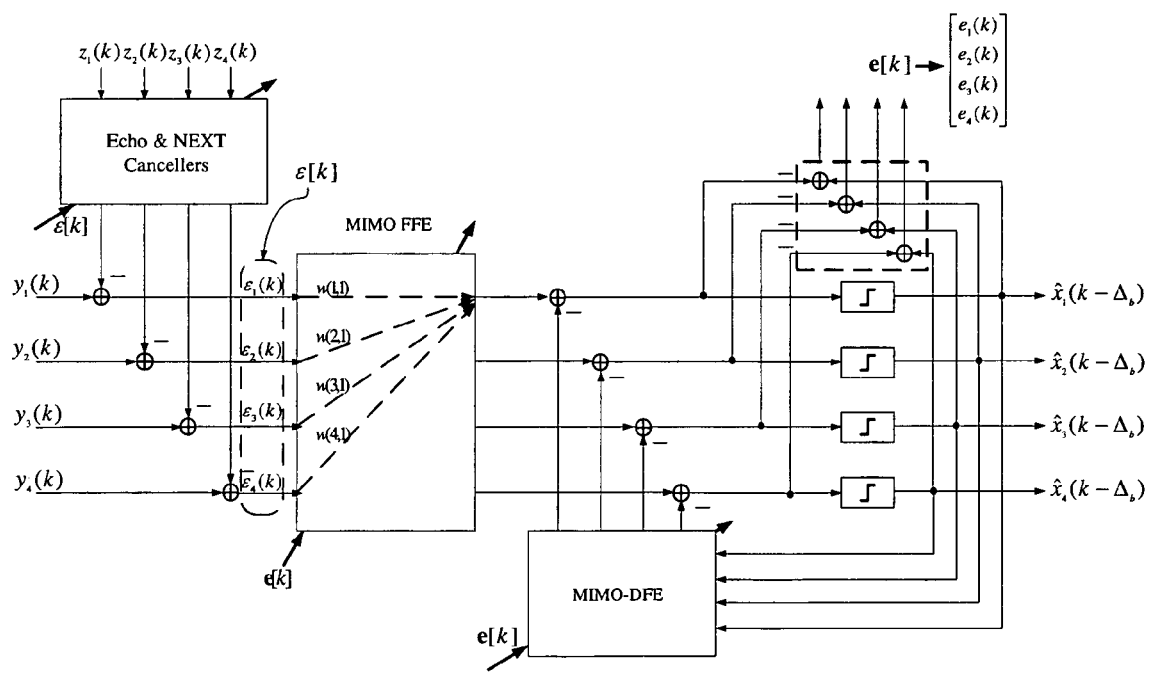
FIG. 6 illustrates block diagram of the separate MIMO-DFE equalization and cancellation adaptive structure.

One problem associated with the design in FIG. 4 is that echo & NEXT cancellers are performed after FFE, and FFE filtering will affect echo & NEXT channel characteristics, i.e., channel length or amplitude, especially when FFE filters are very long, which will result in long echo & NEXT cancellers. To solve this problem, consider the structure in FIG. 6, where echo & NEXT cancellers are implemented before FFE. In this arrangement, cancellers and the MIMO-DFE are independently adapted to minimize $E(\epsilon^2)$ and $E(e^2)$. However, for given Echo & NEXT cancellers, the optimal Echo & NEXT cancellers in the sense of minimizing $E(\epsilon^2)$ may not be the one that also minimizes $E(e^2)$. In other words, increasing the length of the echo & NEXT cancellers in this case does not necessarily reduce $E(e^2)$ as desired. Through simulations, it was found that separate minimization structure has 0.05-0.2 dB gain over jointly adapted structure with same canceller length in different channel models (See, e.g., IEEE 802.3an Study Group, http://www.ieee802.org/3/an/public/material/index.html).

Although MMSE-DFE based structure has been proven an effective structure for combatting ISI, one problem associated with MMSE-DFE structure is catastrophic error propagation, which degrades equalization performance significantly when SNR gain at the decision point is very low. Recently, TH precoding has been proposed to be used in 10GBASE-T because it can eliminate error propagation and allow use of capacity-achieving channel codes, such as low-density parity-check (LDPC) codes, in a natural way. Despite the use of THP, the data channel exhibits a large amount of pre-cursor ISI due to the spreading of transmitted pulse. Therefore, equalization is still needed at the receiver side to mitigate the pre-cursor ISI and restore the transmitted symbols.

Background on Tomlinson-Harashima Precoding

Figure 7:
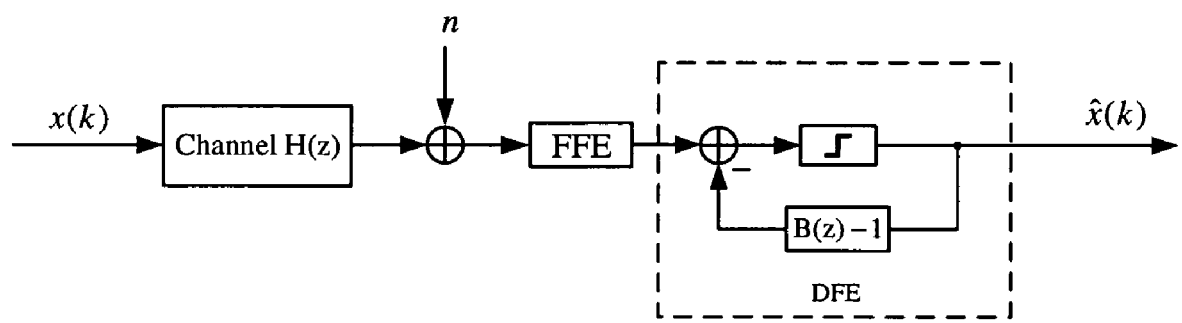
FIG. 7 illustrates the general structure of decision feedback equalizer.

FIG. 7 shows a general DFE equalizer which is widely used in many communication systems. Since DFE structures use the previous decisions $\{\hat{x}_i\}_{i=-\infty}^{k-1}$ to decide $\hat{x}_k$, if one of the previous decisions is incorrect, it may affect next decision and lead to error propagation. To eliminate the error propagation, one approach is to implement the feedback section of the DFE structures at the transmitter since previous symbols available at the transmitter are error free. However, this approach will increase the transmit power because the output of the pre-equalizer has a large dynamic range.

Figure 8:
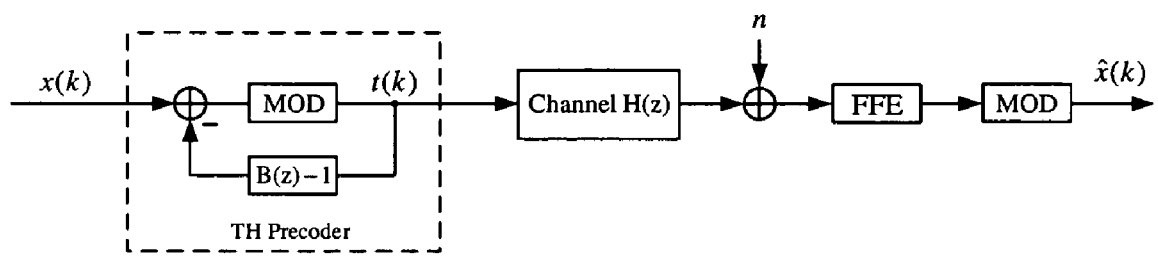
FIG. 8 illustrates block diagram of a typical application of TH precoding in 10GBASE-T.
Figure 8:
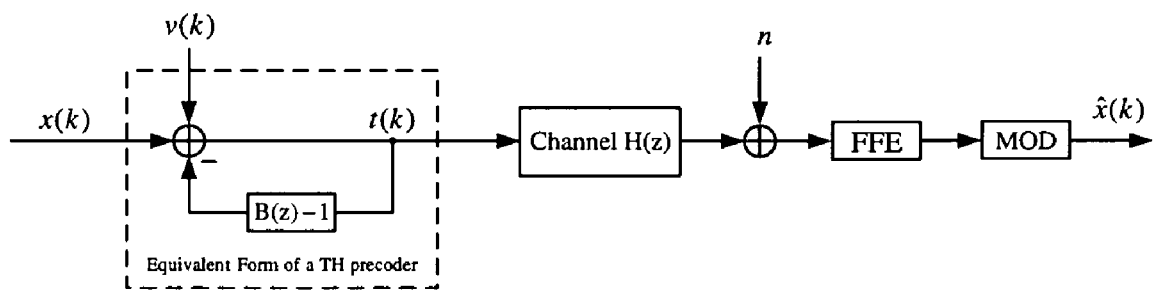

Tomlinson and Harashima (See, M. Tomlinson, "New automatic equalizer employing modulo arithmetic," *Electron. Lett.*, vol. 7, pp. 138-139, March 1971; and H. Harashima and H. Miyakawa, "Matched-transmission technique for channels with intersymbol interference," *IEEE Trans. Commun.*, vol. 20, pp. 774-780, August 1972) proposed to limit the output dynamic range by using a nonlinear modulo device in the feedforward path of the pre-equalizer, as shown in FIG. 8(a). The resulting pre-equalizer is called a TH precoder. The operation of TH precoding can be interpreted by using the equivalent form of the TH precoder in FIG. 8(b). A unique compensation signal v (k), which is a multiple of 2M, is added to the transmitted PAM-M signal x(k) such that the output of the precoder t(k) is limited in the interval [−M, M). So the effective transmitted data sequence in z-domain is given by $$T(z) = \frac{X(z) + V(z)}{B(z)}, \quad \text{EQ. (6)}$$

and X(z) can be recovered from the output of the FFE by performing a modulo operation (marked MOD in FIG. 8).

Figure 9:
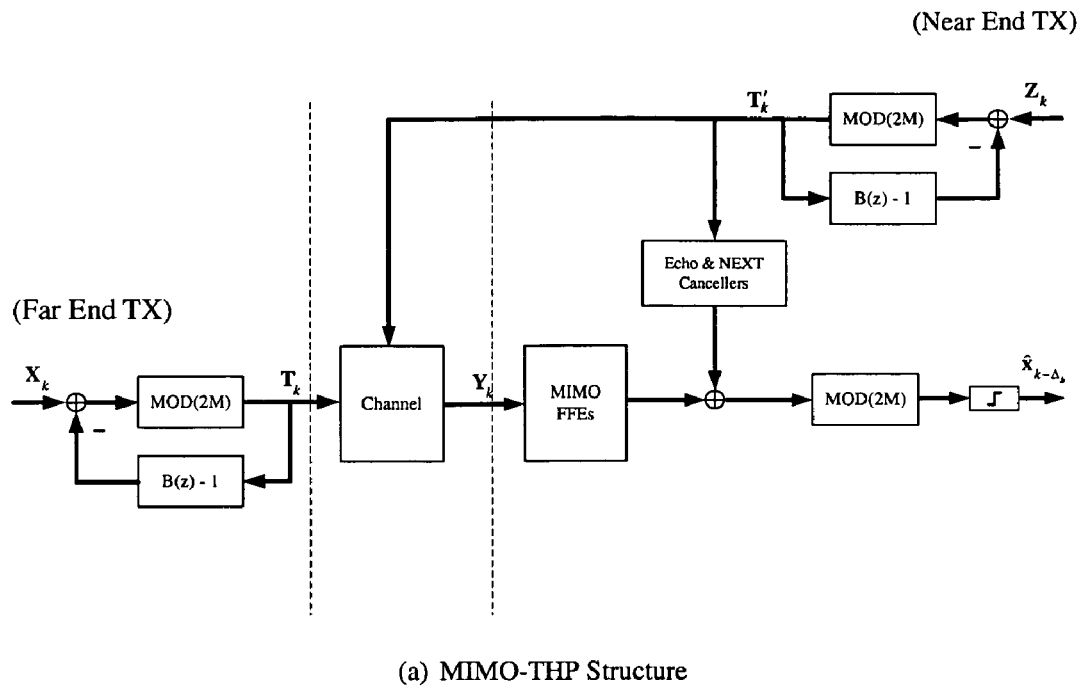
FIG. 9 illustrates a straightforward approach of MIMO equalization for 10GBASE-T with TH preceding.
Figure 9:
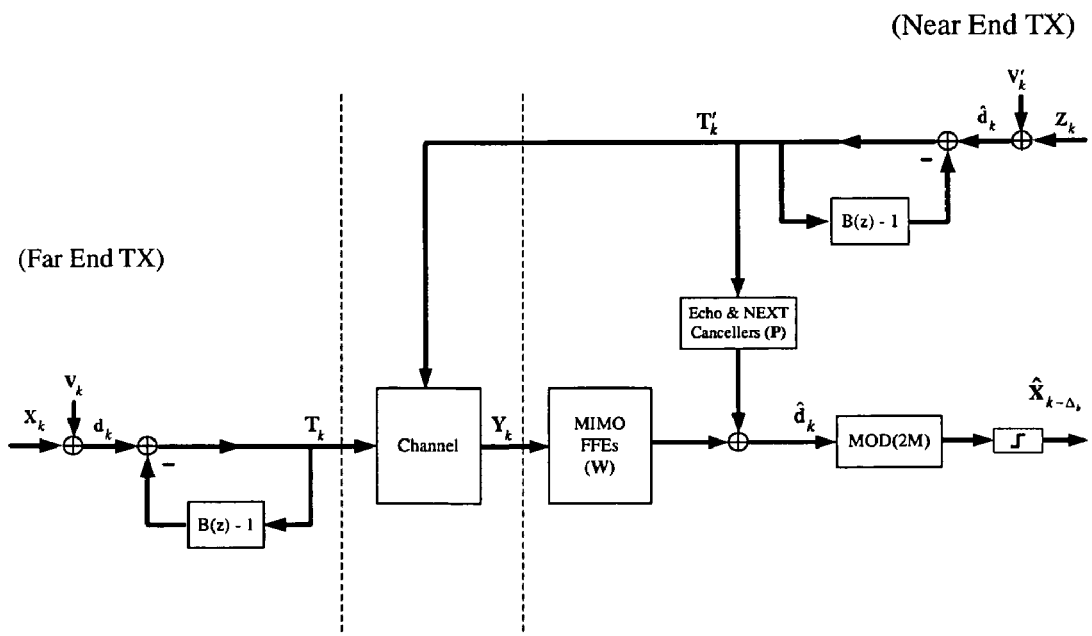
Figure 10:
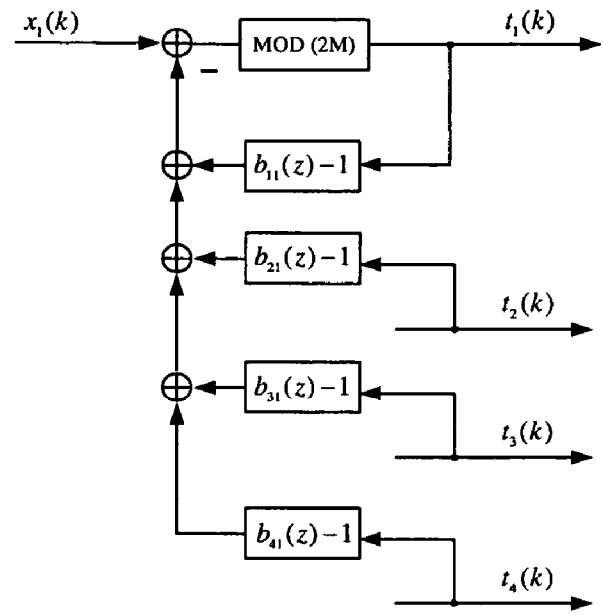
FIG. 10 illustrates the detailed structure of MIMO TH precoder for one pair.
Figure 10:
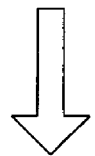
Figure 10:
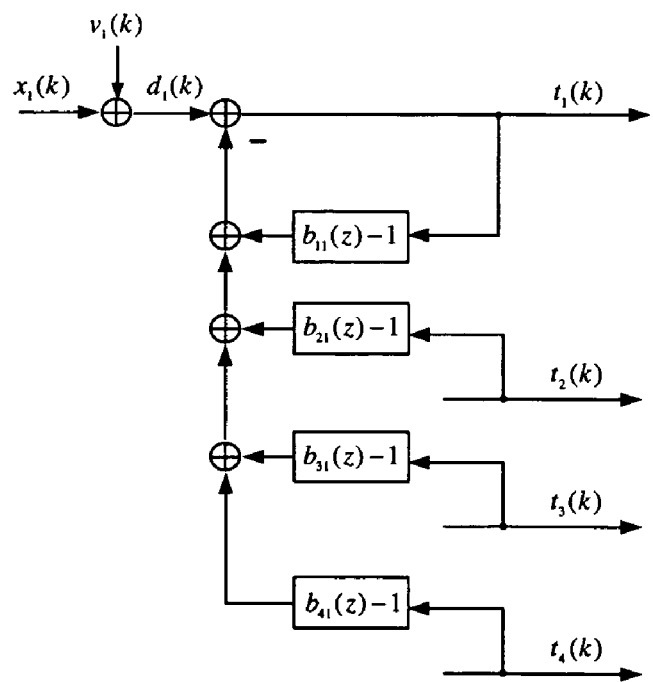

By introducing the TH precoding technique into 10GBASE-T transmission system, we will have the architecture shown in FIG. 9(a), where $X_k$ denotes far end transmitted vector and $Z_k$ denotes near end transmitted vector. Due to the TH preceding, the effective transmitted vectors going through the physical channel are $T_k$ and $T'_k$ from far end and near end, respectively. B(z) represents a MIMO THP precoder, which is implemented at the transmitter side to pre-distort the transmitted symbols. The detailed MIMO TH precoder structure for one pair is shown in FIG. 10. It consists of 4 feedback filters with the input of effective transmitted signals $t_k$ and a nonlinear modulo device to limit the output dynamic range. While, at the receiver side, different from MIMO-DFE structure mentioned before, MIMO DFE equalizer is not needed any more due to the preceding. The received signals first go through MIMO FFE equalizers to remove pre-cursor ISI and then echo & NEXT cancellers are used to mitigate the interferences from the near end. To recover the transmitted signals $\hat{X}_k$, modulo operation is needed before the decision slicer.

To analyze the performance of the design in FIG. 9(a), an equivalent form is usually considered as shown in FIG. 9(b). It can be shown that by setting the coefficients of the TH precoders the same as those of the feedback filters in the MIMO-DFE structures, the system design is still optimal. However, this straightforward design may not be compatible with the most recent proposal approved by 10GBASE-T Task Force (See, IEEE 803.2an Draft Standard (4.0), Physical layer parameters and specifications 10 Gb/s operation over 4-Pair of category 6 balanced copper cabling, type 10GBASE-T, 2005), because 12 additional cross-channel pre-equalizers are to be implemented at the transmitter, which will increase the complexity of the transmitter. One possible solution is to retain only 4 separate TH precoders at the transmitter as suggested by 10GBASE-T Task Force and eliminate the cross-channel pre-equalizers. However, this method will result in about 2 dB performance loss. Therefore, a new design is proposed next which is compatible with the 10GBASE-T standard and does not result in performance loss.

The Proposed MIMO MMSE-THP Design

Figure 11:
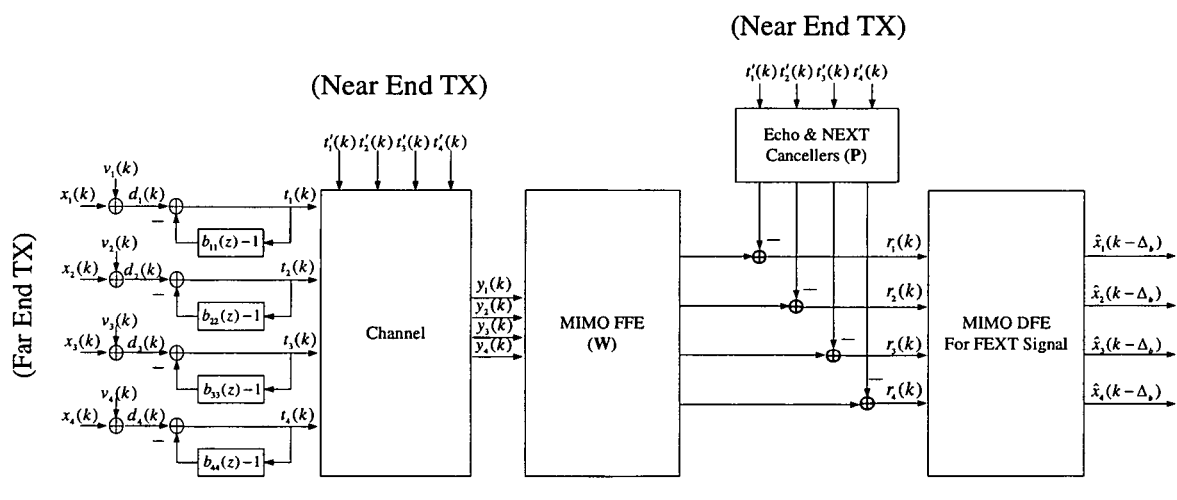
FIG. 11 illustrates the block diagram of the proposed MIMO equalization approach for 10GBASE-T.
Figure 12:
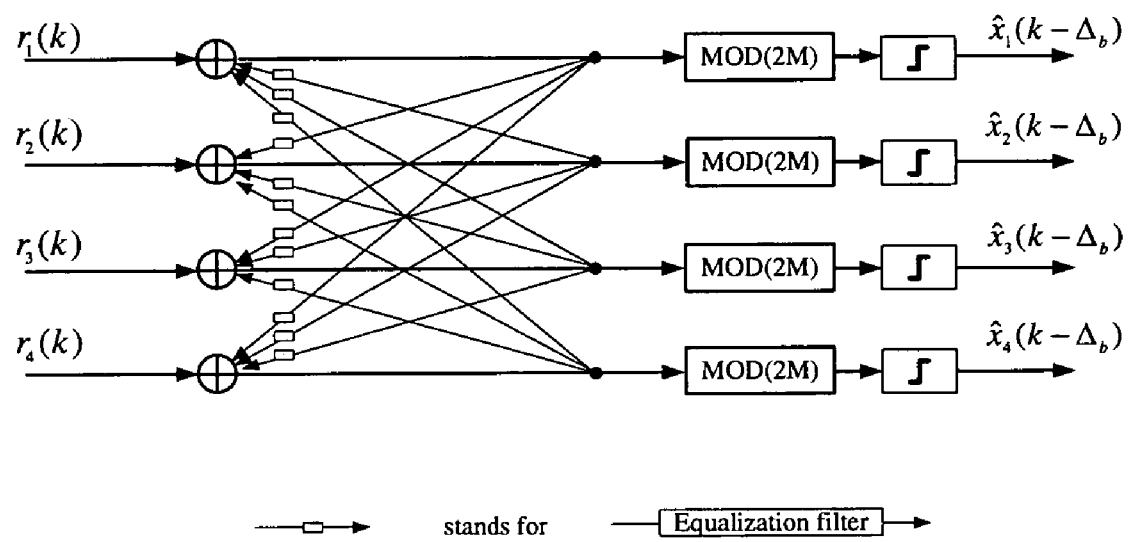
FIG. 12 illustrates the detailed block diagram of the partial MIMO DFE for FEXT signal.

As pointed in the previous section, the straightforward design is not compatible with the standard by IEEE802.3an and also leads to an increase in the complexity at the transmitter side. To solve this problem and make the design compatible with the IEEE 802.3an standard while maintaining the optimal performance, we propose to implement the cross-channel pre-equalizers at the receiver side and retain the 4 separate TH pre-coders at the transmitter side. The block diagram of the proposed design is shown in FIG. 11. In this figure, the same MIMO FFE structure as shown in FIG. 5 is used to remove pre-cursor ISI and exploit the FEXT signals. Instead of using a MIMO-THP structure, 4 separate TH-precoders are used to deal with post-cursor channel ISI at the transmitter side and a partial MIMO-DFE structure is used to combat the residual post-cursor interferences at the receiver side. The detailed structure of the partial MIMO-DFE is shown in FIG. 12. It contains 12 cross feedback equalizers, as well as four nonlinear modulo devices and slicers. However, designing the equalizers in the cross feedback paths is not straightforward since they each implicitly contain an IIR filter, which will increase the implementation complexity.

Figure 13:
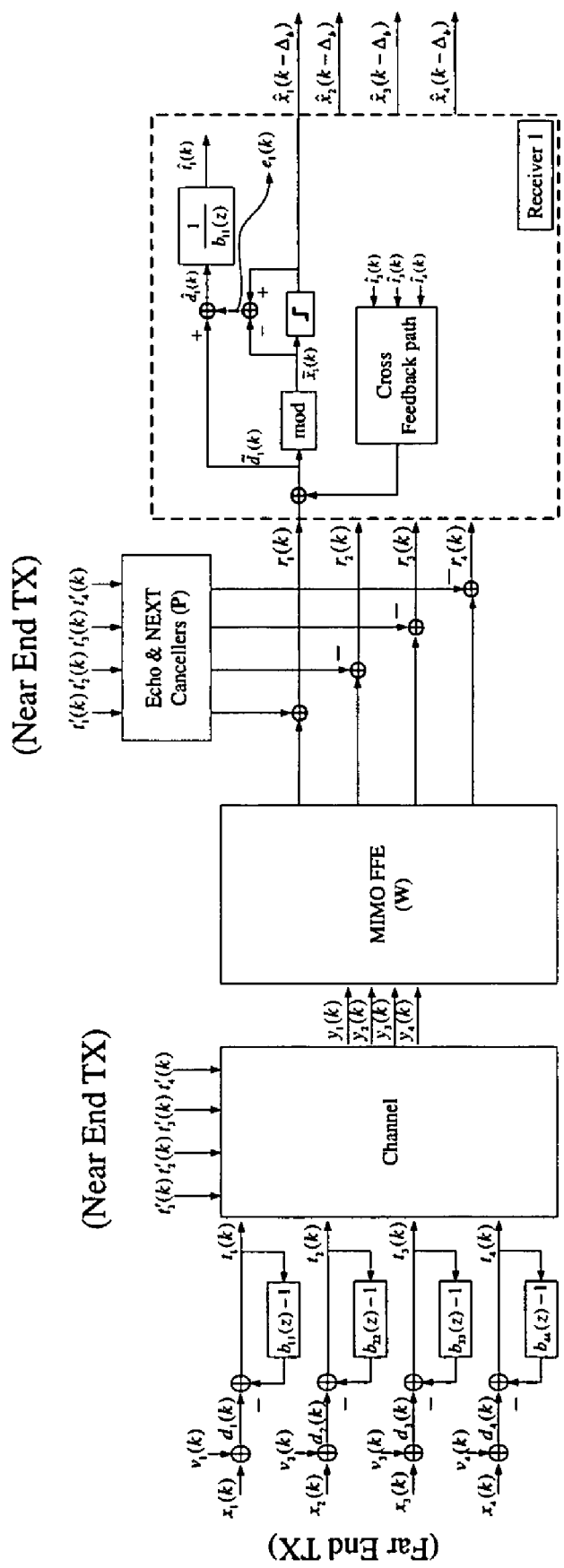
FIG. 13 illustrates the receiver design of the proposed approach in FIG. 11 for one pair.

Consider FIG. 13 (for simplicity, we only show one receiver as an example), we introduce $$\frac{1}{b_{ii}(z)}$$

into the cross feedback path to balance the effect of the implicit IIR. It can be shown that by choosing the coefficients of the IIR filters to be the same as those of the corresponding precoders, an optimal MMSE solution can be reached.

Figure 14:
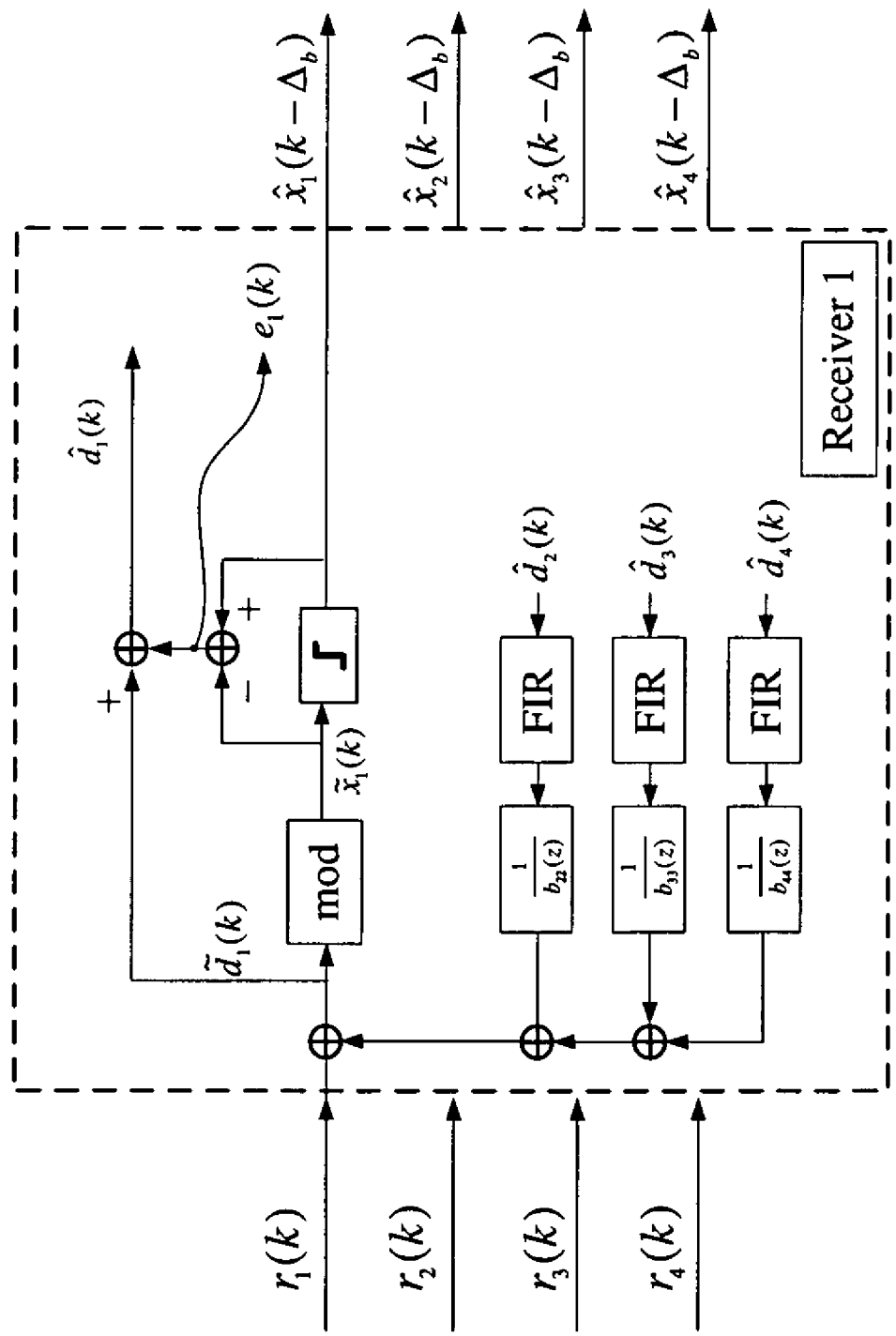
FIG. 14 illustrates the modified receiver design for FIG. 13.

Since a fixed IIR filter is introduced to obtain the optimal system performance at each cross feedback path as shown in FIG. 13, the output of the IIR filter $\hat{t}_i(k)$ might take a large number of possible values even with finite possible inputs. The word-length of the successive cross feedback datapath will also be greatly increased. This will finally increase the complexity of the hardware implementation of 12 cross feedback equalizers. In this invention, A method is introduced to reduce the implementation complexity by moving the IIR filter before the feedback FIR filter for each cross feedback path as shown in FIG. 14 (here, we only show the receiver part corresponding to pair 1). Now the input of the feedback FIR filter is finite, therefore many techniques, such as precomputation and data encoding, can be used to implement these FIR filters efficiently with reduced word-length and reduced silicon area.

Figure 15:
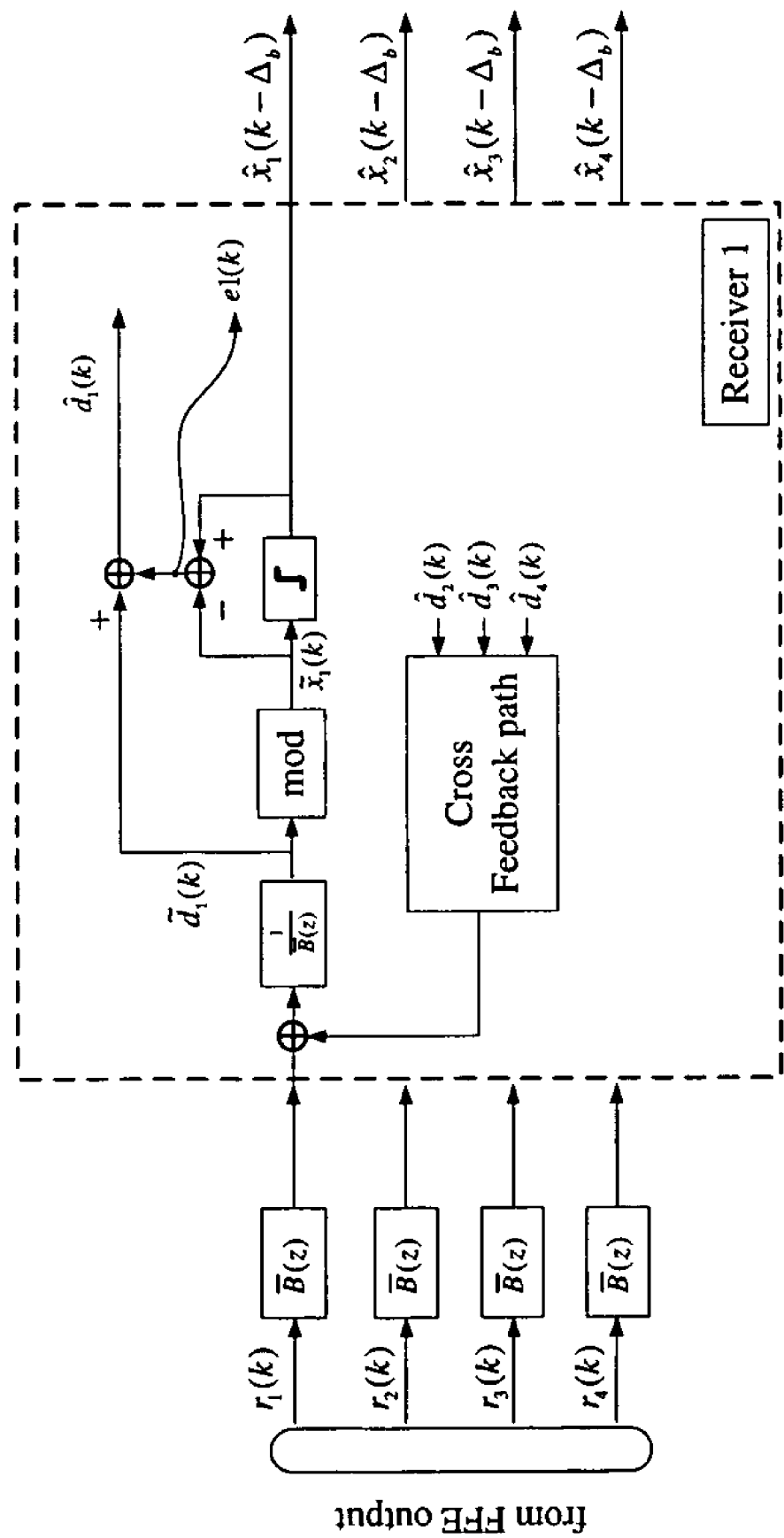
FIG. 15 illustrates the proposed receiver design with low complexity.

In practice, the coefficients of the four separate precoders $b_{ii}(z)_{i=1,2,3,4}$ are assumed to be the same, say, $\overline{B}(z)$. We can further reduce the complexity of the receiver design as shown in FIG. 15. Consider one channel at the receiver side, the IIR filter $$\frac{1}{b_{ii}(z)}$$

is removed from the cross feedback path, however, a corresponding FIR filter $\overline{B}(z)$ is added to the signal receiving path after the echo & NEXT cancellation. Here note that the coefficients of the added FIR filter $\overline{B}(z)$ are set using the coefficients of the corresponding TH precoder. To compensate the effect of the FIR $\overline{B}(z)$ on the received signal, the filter $$\frac{1}{\overline{B}(z)}$$

is added before the MOD operation. The same method can be applied to the other three channels at the receiver side. As we can see, the design in FIG. 15 is simple and effective, and it can achieve low complexity in real implementations. It may be noted that the designs in FIG. 13, FIG. 14 and FIG. 15 are only examples of MIMO equalizations for systems using TH precoders. Other embodiments not shown here can be derived by a person skilled in the relevant art by using the main ideas of this invention.

Simulation Results

Figure 16:
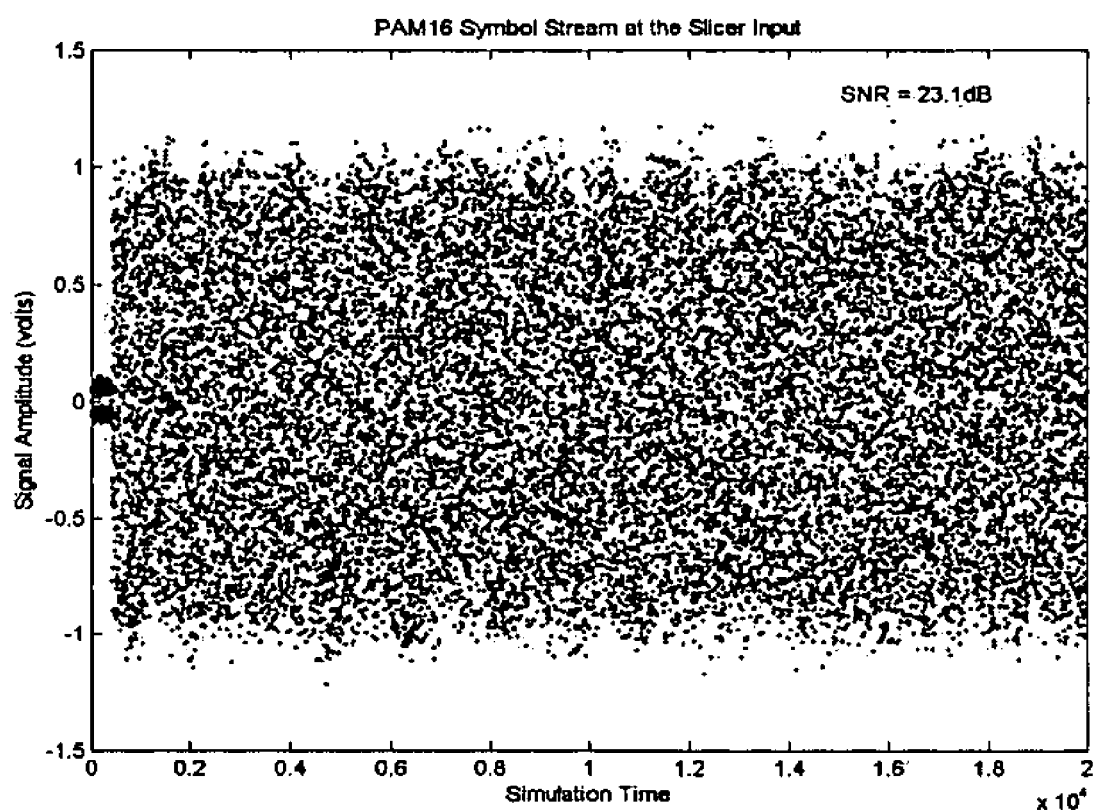
FIG. 16 illustrates discrete time eye diagram before the decision device for the traditional method.
Figure 17:
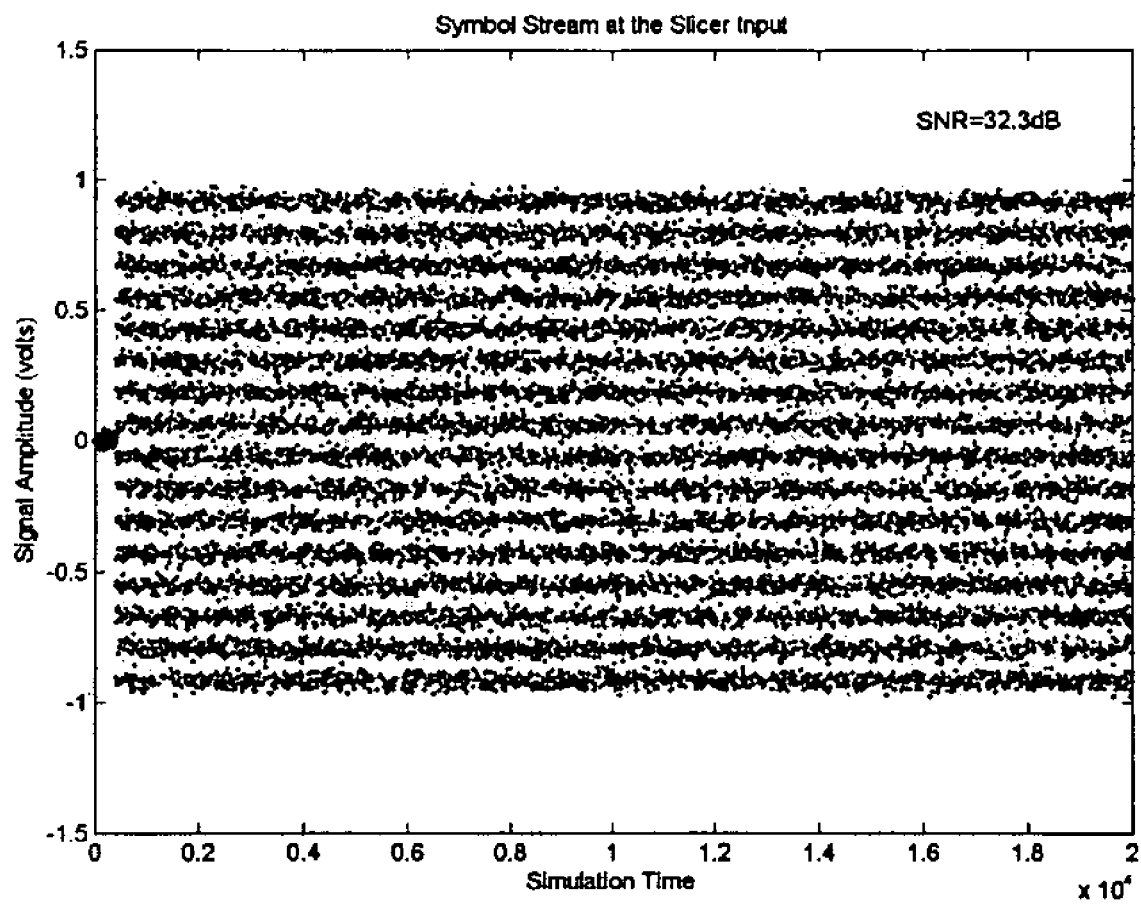
FIG. 17 illustrates discrete time eye diagram before the decision device for the proposed MIMO-DFE structure.
Figure 18:
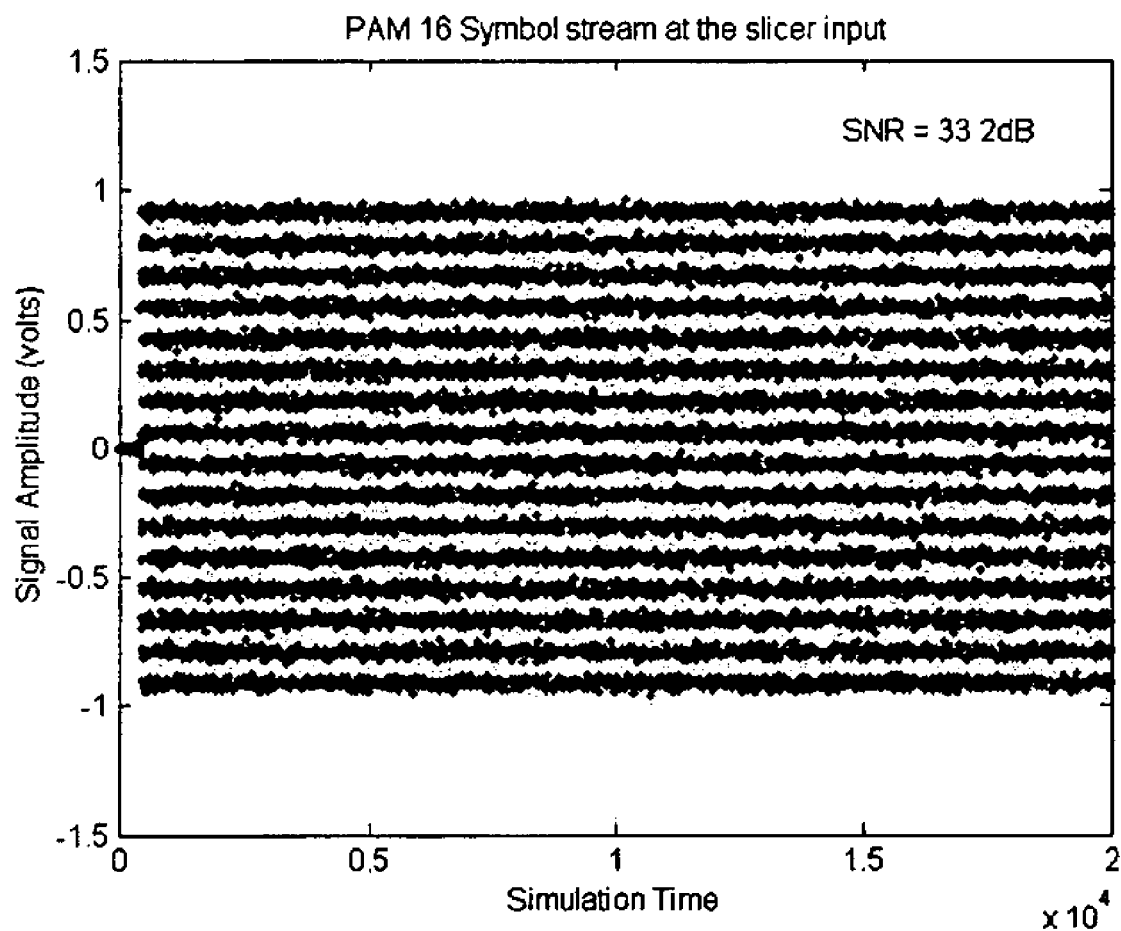
FIG. 18 illustrates discrete time eye diagram before the decision device for the proposed MIMO equalization method with TH precoding.

Finally, some simulation results are presented to show the advantage of the proposed design over traditional equalization scheme. FIG. 16 shows the discrete time eye diagram (a plot of the soft symbol decisions before the slicer) over 55 m UTP cables[1] for traditional design in FIG. 2. FIG. 17 shows the discrete time eye diagram over the same cable environment but for the proposed MIMO-DFE design in FIG. 4. The discrete time eye diagram in FIG. 18 corresponds to the system design with TH precoding shown in FIG. 11. From these figures, it is clear that the new proposed design is better than the traditional transceiver design, where FEXT crosstalk is cancelled as noise.

[1] All these channel models can be obtained from IEEE 802.3an 10GBASE-T Study Group.

CONCLUSIONS

A new method to efficiently deal with FEXT crosstalk in 10GBASE-T system by MIMO equalization techniques is presented. The corresponding transceiver design via MIMO equalization with low complexity is also presented. The system evaluation shows that, by using the proposed MIMO equalization, an SNR (signal to noise ratio) improvement of around 0.5-9 dB can be achieved over the traditional equalization technique in twisted-pair channel environment. Thus, the resulting design can be used for crosstalk affected communication systems, such as 10 Gigabit Ethernet over copper.

It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A communications transceiver, comprising:
   i. N transmitters;
   ii. An N-input N-output receiver, comprising:
      (a) A multi-input multi-output (MIMO) canceller filter, with N inputs and N outputs, for canceling echo and near end cross talk (NEXT), coupled to the outputs of the N transmitters, comprising a plurality of feed-forward digital filters with self and cross connections;
      (b) A MIMO feed-forward equalizer (FFE) containing a plurality of digital filters with self and cross connections;
      (c) A MIMO decision-feedback equalizer (DFE), containing a plurality of digital filters with self and cross connections, used for far-end cross talk processing;
      (d) N decision devices or slicers, whose inputs are controlled by the outputs of the MIMO canceller filter, MIMO feed-forward equalizer, and MIMO decision-feedback equalizer, whose outputs are coupled to the MIMO decision-feedback equalizer, and are the outputs of the receiver;
      (e) Generation of N first error signals by subtracting the inputs of the N slicers from their corresponding outputs, used to adapt the coefficients of the digital filters.

2. The communications transceivers in claim 1, wherein the N inputs of the MIMO feed-forward filter are coupled to the N received signals; N inputs of the N slicers or decision devices are generated by subtracting the sum of the N outputs of the MIMO DFE and N outputs of the MIMO Echo & NEXT canceller filter from the N outputs of the MIMO FFE, and wherein the coefficients of the digital filters used in the MIMO-DFE, MIMO FFE, and MIMO Echo & NEXT canceller are adapted by the N said first error signals generated in claim 1.

3. The communications transceiver in claim 1, wherein N second error signals are generated by subtracting the N outputs of the MIMO Echo & NEXT canceller from the N received signals, the said second error signals are coupled to the N inputs of the MIMO FFE, and the N signals generated by subtracting the N outputs of the MIMO FFE from the N outputs of the MIMO DFE are coupled to the N slicers or decision devices; and wherein the said second error signals are used to adapt the coefficients of the MIMO Echo & NEXT canceller, and the said first error signals in claim 1 are used to adapt the coefficients of the MIMO FFE and MIMO DFE.

4. The communications transceiver in claim 1, wherein said transceiver is used for Ethernet over copper cables.

5. The communications transceiver in claim 1, wherein said transceiver is operated at a baud rate of at least 800 Mbaud.

6. The communications transceiver in claim 1, wherein N=4.

7. A communications transceiver, comprising:
   i. N transmitters, wherein each transmitter contains a precoder filter;
   ii. An N-input N-output receiver, comprising:
      (a) A multi-input multi-output (MIMO) canceller filter, with N inputs and N outputs, for canceling echo and near end cross talk (NEXT), coupled to the outputs of the N transmitters, comprising a plurality of feed-forward digital filters with self and cross connections;
      (b) A MIMO feed-forward equalizer (FFE) containing a plurality of digital filters with self and cross connections, coupled to the N received input signals;
      (c) A MIMO decision-feedback equalizer (DFE), containing a plurality of digital filters with cross connections;
      (d) N modulo devices controlled by the N outputs of the MIMO DFE, N outputs of the MIMO FFE and the N outputs of the MIMO Echo & NEXT canceller;
      (e) N decision devices or slicers, whose inputs are the outputs of the N modulo devices, and whose outputs are the outputs of the receiver;
      (f) Generation of N first error signals by subtracting the inputs of the N slicers from their corresponding outputs, used to adapt the coefficients of the digital filters in MIMO DFE, MIMO FFE, and MIMO Echo & NEXT canceller;
      (g) Generation of N first desired signals by taking the sum of the N inputs of the modulo devices and their corresponding said first error signals, which are coupled to the cross feedback filters in the MIMO DFE.

8. The communications transceiver in claim 7, wherein the outputs of the cross-feedback filters in the MIMO-DFE are coupled to cross-feedback path IIR digital filters with same transfer function as the precoder filters in the transmitters in claim 7; and wherein the inputs to the modulo devices are generated by subtracting the sum of the outputs of the said cross-feedback path IIR digital filters from the difference of the MIMO FFE and MIMO Echo & NEXT canceller.

9. The communications transceiver in claim 7, wherein the N outputs of the MIMO Echo & NEXT canceller are subtracted from the N outputs of the MIMO FFE, and these N difference signals are coupled to N FIR digital filters with same coefficients as the FIR filters in the feedback paths of the precoders in the transmitters of claim 7; and wherein the sum of the said FIR digital filter and the cross-feedback filters in the MIMO-DFE is coupled to an IIR filter with same transfer function as the precoder in the transmitter; and the output of the said IIR filter is coupled to the corresponding modulo device.

10. The communications transceiver in claim 7, wherein said transceiver is used for Ethernet over copper cables.

11. The communications transceiver in claim 7, wherein said transceiver is operated at a baud rate of at least 800 Mbaud.

12. The communications transceiver in claim 7, wherein N=4.

13. An integrated circuit having a substrate and a communications transceiver disposed on said substrate, said communications transceiver comprising:
   i. N transmitters;
   ii. An N-input N-output receiver, comprising:
      (a) A multi-input multi-output (MIMO) canceller filter, with N inputs and N outputs, for canceling echo and near end cross talk (NEXT), coupled to the outputs of the N transmitters, comprising a plurality of feed-forward digital filters with self and cross connections;
      (b) A MIMO feed-forward equalizer (FFE) containing a plurality of digital filters with self and cross connections;
      (c) A MIMO decision-feedback equalizer (DFE), containing a plurality of digital filters with self and cross connections, used for far-end cross talk processing;
      (d) N decision devices or slicers, whose inputs are controlled by the outputs of the MIMO canceller filter, MIMO feed-forward equalizer, and MIMO decision-feedback equalizer, whose outputs are coupled to the MIMO decision-feedback equalizer, and are the outputs of the receiver;
      (e) Generation of N first error signals by subtracting the inputs of the N slicers from their corresponding outputs, used to adapt the coefficients of the digital filters.

14. The integrated circuit in claim 13, wherein the N inputs of the MIMO feed-forward filter are coupled to the N received signals; N inputs of the N slicers or decision devices are generated by subtracting the sum of the N outputs of the MIMO DFE and N outputs of the MIMO canceller filter used to cancel echo and NEXT from the N outputs of the MIMO FFE, and wherein the coefficients of the digital filters used in the MIMO-DFE, MIMO FFE, and MIMO Echo & NEXT canceller are adapted by the N first error signals generated in claim 13.

15. The integrated circuit in claim 13, wherein N second error signals are generated by subtracting the N outputs of the MIMO Echo & NEXT canceller from the N received signals, the said second error signals are coupled to the N inputs of the MIMO FFE, and the N signals generated by subtracting the N outputs of the MIMO FFE from the N outputs of the MIMO DFE are coupled to the N slicers or decision devices; and wherein the said second error signals are used to adapt the coefficients of the MIMO Echo & NEXT canceller, and the said first error signals in claim 13 are used to adapt the coefficients of the MIMO FFE and MIMO DFE.

16. The integrated circuit in claim 13, wherein said transceiver is used for Ethernet over copper cables.

17. The integrated circuit in claim 13, wherein said transceiver is operated at a baud rate of at least 800 Mbaud.

18. The integrated circuit in claim 13, wherein N=4.

19. An integrated circuit having a substrate and a communications transceiver disposed on said substrate, said communications transceiver comprising:
   i. N transmitters, wherein each transmitter contains a precoder filter;
   ii. An N-input N-output receiver, comprising:
      (a) A multi-input multi-output (MIMO) canceller filter, with N inputs and N outputs, for canceling echo and near end cross talk (NEXT), coupled to the outputs of the N transmitters, comprising a plurality of feed-forward digital filters with self and cross connections;
      (b) A MIMO feed-forward equalizer (FFE) containing a plurality of digital filters with self and cross connections, coupled to the N received input signals;
      (c) A MIMO decision-feedback equalizer (DFE), containing a plurality of digital filters with cross connections;
      (d) N modulo devices controlled by the N outputs of the MIMO DFE, N outputs of the MIMO FFE and the N outputs of the MIMO Echo & NEXT canceller;
      (e) N decision devices or slicers, whose inputs are the outputs of the N modulo devices, and whose outputs are the outputs of the receiver;
      (f) Generation of N first error signals by subtracting the inputs of the N slicers from their corresponding outputs, used to adapt the coefficients of the digital filters in MIMO DFE, MIMO FFE, and MIMO Echo & NEXT canceller;
      (g) Generation of N first desired signals by taking the sum of the N inputs of the modulo devices and their corresponding first error signals, which are coupled to the cross feedback filters in the MIMO DFE.

20. The integrated circuit in claim 19, wherein the outputs of the cross-feedback filters in the MIMO-DFE are coupled to cross-feedback path IIR digital filters with same transfer function as the precoder filters in the transmitters in claim 19; and wherein the inputs to the modulo devices are generated by subtracting the sum of the outputs of the said cross-feedback path IIR digital filters from the difference of the MIMO FFE and MIMO Echo & NEXT canceller.

21. The integrated circuit in claim 19, wherein the N outputs of the MIMO Echo & NEXT Canceler are subtracted from the N outputs of the MIMO FFE, and these N difference signals are coupled to N FIR digital filters with same coefficients as the FIR filters in the feedback paths of the precoders in the transmitters of claim 19; and wherein the sum of the said FIR digital filter and the cross-feedback filters in the MIMO-DFE is coupled to an IIR filter with same transfer function as the precoder in the transmitter; and the output of the said IIR filter is coupled to the corresponding modulo device.

22. The integrated circuit in claim 19, wherein said transceiver is used for Ethernet over copper cables.

23. The integrated circuit in claim 19, wherein said transceiver is operated at a baud rate of at least 800 Mbaud.

24. The integrated circuit in claim 19, wherein N=4.

* * * * *